United States Patent
Kirby (10) Patent No.: US 10,723,660 B2
(45) Date of Patent: Jul. 28, 2020

(54) CARBON YIELDING RESIN FOR MELT INFILTRATION

(71) Applicant: General Electric Company, Schenectady, NY (US)

(72) Inventor: Glen Harold Kirby, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 648 days.

(21) Appl. No.: 15/403,706

(22) Filed: Jan. 11, 2017

(65) Prior Publication Data

US 2018/0194690 A1    Jul. 12, 2018

(51) Int. Cl.
| | | |
|---|---|---|
| C04B 35/58 | (2006.01) | |
| C04B 35/80 | (2006.01) | |
| C04B 35/65 | (2006.01) | |
| C04B 35/628 | (2006.01) | |

(52) U.S. Cl.
CPC ...... *C04B 35/806* (2013.01); *C04B 35/62868* (2013.01); *C04B 35/65* (2013.01); *C04B 2235/48* (2013.01); *C04B 2235/5244* (2013.01); *C04B 2235/616* (2013.01)

(58) Field of Classification Search
CPC .................. C04B 35/806; C04B 35/62868
See application file for complete search history.

(56) References Cited

U.S. PATENT DOCUMENTS

| | | | | |
|---|---|---|---|---|
| 5,106,393 | A | * | 4/1992 | Ringwood ............... B01J 3/062 51/293 |
| 5,840,221 | A | * | 11/1998 | Lau .......................... B28B 1/265 264/29.7 |
| 6,403,158 | B1 | * | 6/2002 | Corman ................. C04B 35/573 264/101 |
| 7,507,466 | B2 | | 3/2009 | Steibel et al. |
| 7,754,126 | B2 | | 7/2010 | Subramanian et al. |
| 7,832,972 | B2 | | 11/2010 | Jarmon |
| 8,043,720 | B2 | | 10/2011 | Corman et al. |
| 8,128,861 | B1 | * | 3/2012 | Aghajanian ........... C04B 35/563 264/682 |
| 8,475,695 | B2 | | 7/2013 | Carper et al. |
| 8,980,435 | B2 | | 3/2015 | de Diego |
| 2004/0192534 | A1 | * | 9/2004 | Nixon ................... C04B 35/565 501/95.2 |

(Continued)

OTHER PUBLICATIONS

Einset—https://www.sciencedirect.com/science/article/pii/S0009250997003795 (Year: 1996).*

(Continued)

*Primary Examiner* — Leith S Shafi
*Assistant Examiner* — Nicholas R Krasnow
(74) *Attorney, Agent, or Firm* — Dority & Manning, P.A.

(57) ABSTRACT

Methods for forming a ceramic matrix composite from a melt infiltrated and melt extracted preform that has residual silicon within open pore channels therein are provided. The method may include: introducing a carbon yielding resin into the open pore channels; heating the preform to produce elemental carbon from the carbon yielding resin within the open pore channels; and further heating the elemental carbon to react with the residual silicon to form SiC within the open pore channels to form the ceramic matrix composite.

17 Claims, 4 Drawing Sheets

(56) References Cited

U.S. PATENT DOCUMENTS

| | | | | |
|---|---|---|---|---|
| 2012/0076927 | A1* | 3/2012 | Bhatt | C04B 35/565 427/122 |
| 2013/0167374 | A1* | 7/2013 | Kirby | H04W 4/80 29/888.02 |
| 2013/0287941 | A1* | 10/2013 | Gray | B05D 3/107 427/228 |
| 2014/0109756 | A1* | 4/2014 | Aghjanian | C04B 41/009 89/36.02 |
| 2015/0115489 | A1 | 4/2015 | Corman | |
| 2016/0016807 | A1* | 1/2016 | Bracamonte | C01B 32/956 423/345 |
| 2017/0029339 | A1* | 2/2017 | Weaver | B05D 7/24 |
| 2017/0029340 | A1* | 2/2017 | Weaver | C04B 35/80 |
| 2017/0233300 | A1* | 8/2017 | Raj | C09D 183/16 118/697 |
| 2017/0275210 | A1* | 9/2017 | Corman | F01D 5/282 |
| 2017/0313627 | A1* | 11/2017 | Shim | C04B 35/657 |
| 2017/0313629 | A1* | 11/2017 | Shim | C04B 35/584 |
| 2018/0105471 | A1* | 4/2018 | Shi | C04B 35/565 |
| 2018/0312442 | A1* | 11/2018 | Shinavski | C04B 35/573 |
| 2018/0313419 | A1* | 11/2018 | Enomoto | F16D 69/023 |
| 2019/0292107 | A1* | 9/2019 | Kirkpatrick | C04B 35/524 |

OTHER PUBLICATIONS

Arai—https://www.sciencedirect.com/science/article/pii/S0272884219311630#bib82 (Year: 2019).*

* cited by examiner

CARBON YIELDING RESIN FOR MELT INFILTRATION

FIELD

The present invention generally relates to ceramic matrix composite (CMC) articles and processes for their production. More particularly, a melt infiltration process is provided that uses a carbon yielding resin to convert residual silicon to SiC in melt-extracted ceramic matrix components, such as silicon carbide fiber reinforced silicon carbide composites.

BACKGROUND

Higher operating temperatures for gas turbine engines are continuously sought in order to increase their efficiency. Though significant advances in high temperature capabilities have been achieved through formulation of iron, nickel and cobalt-base superalloys, alternative materials have been investigated. CMC materials are a notable example because their high temperature capabilities can significantly reduce cooling air requirements. CMC materials generally comprise a ceramic fiber reinforcement material embedded in a ceramic matrix material. The reinforcement material may be discontinuous short fibers dispersed in the matrix material or continuous fibers or fiber bundles oriented within the matrix material, and serves as the load-bearing constituent of the CMC. In turn, the ceramic matrix protects the reinforcement material, maintains the orientation of its fibers, and serves to dissipate loads to the reinforcement material. Individual fibers (filaments) are often coated with a release agent, such as boron nitride (BN), to form a de-bond layer that allows for limited and controlled slip between the fibers and the ceramic matrix material.

Continuous fiber reinforced ceramic composites (CFCC) are a type of CMC that offers light weight, high strength, and high stiffness for a variety of high temperature load-bearing applications, including shrouds, combustor liners, vanes, blades, and other high-temperature components of gas turbine engines. A CFCC material is generally characterized by continuous fibers (filaments) that may be arranged to form a unidirectional array of fibers, or bundled in tows that are arranged to form a unidirectional array of tows, or bundled in tows that are woven to form a two-dimensional fabric or woven or braided to form a three-dimensional fabric. For three-dimensional fabrics, sets of unidirectional tows may, for example, be interwoven transverse to each other. Of particular interest to high-temperature applications are silicon-based composites, such as silicon carbide (SiC) as the matrix and/or reinforcement material. SiC fibers have also been used as a reinforcement material for a variety of other ceramic matrix materials, including titanium carbide (TiC), silicon nitride ($Si_3N_4$), and alumina ($Al_2O_3$).

The fabrication of CMCs typically involves the use of multiple prepreg layers, each in the form of a "tape" comprising the desired ceramic fiber reinforcement material, one or more precursors of the CMC matrix material, and organic resin binders. According to conventional practice, prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials that are ultimately converted to SiC upon reaction with molten Si. Other typical slurry ingredients include organic binders that promote the pliability of prepreg tapes, and solvents for the binders that promote the fluidity of the slurry to enable impregnation of the fiber reinforcement material.

After allowing the slurry to partially dry and, if appropriate, partially curing the binders (B-staging), the resulting prepreg tape is laid-up with other tapes, and then debulked and, if appropriate, cured while subjected to elevated pressures and temperatures to produce a preform. The preform is then heated (fired) in a vacuum or inert atmosphere to decompose the binders, remove solvents, and convert the precursor to the desired ceramic matrix material. Due to decomposition of the binders, the result is a porous CMC body that may undergo melt infiltration (MI) to fill the porosity and yield the CMC component. Melt-infiltration processes used to produce SiC matrices generally entail infiltrating the porous CMC body with molten silicon supplied externally. The molten silicon infiltrates into the porosity, reacts with the carbon content of the matrix to form silicon carbide, and fills the porosity to yield the desired CMC component.

CMCs and CFCCs articles produced to contain silicon carbide fibers in a silicon carbide matrix in the manner discussed above contain residual silicon metal, which is typically in a continuous phase interwoven between silicon carbide grains that have a small grain size and limited connectivity between adjacent grains.

This silicon phase softens and eventually melts at temperature exceeding about 1204° C., limiting the capability of the MI CMC. Moreover, even if the silicon phase is removed by an extraction process, the resulting silicon carbide material in the CMC is porous and not well-connected, making it a weak phase relative to the fiber. Thus, mechanical load that can be applied is limited at temperatures exceeding 1204° C. even for silicon extracted CMC, since the matrix can crack effectively transferring the load completely to the fibers. Such phenomena results in short creep rupture lives.

As such, a need exists for an improved CMC with higher temperature capabilities, along with methods of its manufacture.

BRIEF DESCRIPTION

Aspects and advantages will be set forth in part in the following description, or may be obvious from the description, or may be learned through practice of the invention.

Methods are generally provided for forming a ceramic matrix composite from a melt infiltrated and melt extracted preform that has residual silicon within open pore channels therein. In one embodiment, the method includes: introducing a carbon yielding resin into the open pore channels; heating the preform to produce elemental carbon from the carbon yielding resin within the open pore channels; and further heating the elemental carbon to react with the residual silicon to form SiC within the open pore channels to form the ceramic matrix composite.

In one embodiment, the carbon yielding resin includes a crosslinkable polymeric material, such as a polyester, a vinyl ester, a furfuryl alcohol based polymer, an epoxy, or a mixture thereof. For example, heating the preform to produce elemental carbon from the carbon yielding resin within the open pore channels may include: heating the preform to a crosslinking temperature (e.g., about 100° C. to about 250° C.) such that the carbon yielding resin is crosslinked within the open pore channels, and thereafter, heating the preform to a char temperature (e.g., about 1315° C. to about 1500° C.) such that the crosslinked carbon yielding resin produces the elemental carbon and reacts with the residual silicon within the open pore channels.

In one particular embodiment, the method may also include, prior to introducing the carbon yielding resin into the open pore channels: melt infiltrating silicon into the preform such that the silicon reacts with carbon in the ceramic matrix composite to form SiC grains (e.g., at a melt infiltration temperature of about 1414° C. to about 1500° C.), and melt extracting to remove at least a portion of unreacted silicon from the preform to open pore channels while leaving residual silicon therein.

In one embodiment, an excess stoichiometric amount of elemental carbon is formed compared to the residual silicon. In such embodiments, the method may further include melt infiltrating silicon to react with the excess stoichiometric amount of elemental carbon to form a dense SiC within the pore channels.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Methods are generally provided for forming a CMC that has, in one embodiment, little to no residual silicon therein. For example, the resulting CMC may be substantially free from elemental silicon therein. In one embodiment, the CMC is formed taking a melt infiltrated CMC that has at least a portion of the residual silicon extracted therefrom, and further processing the MI CMC to backfill the pore network with a carbon yielding resin. The carbon yielding resin may then be decomposed into carbon (e.g., via heat treatment) which may then react with any residual silicon left within the pore network that was not removed in the prior melt-extraction process. In this way, one gets carbon deep into the composite in order to convert the last bit of silicon into silicon carbide that could not be extracted, so as to produce a CMC that is substantially free from residual silicon therein.

Figure 1:
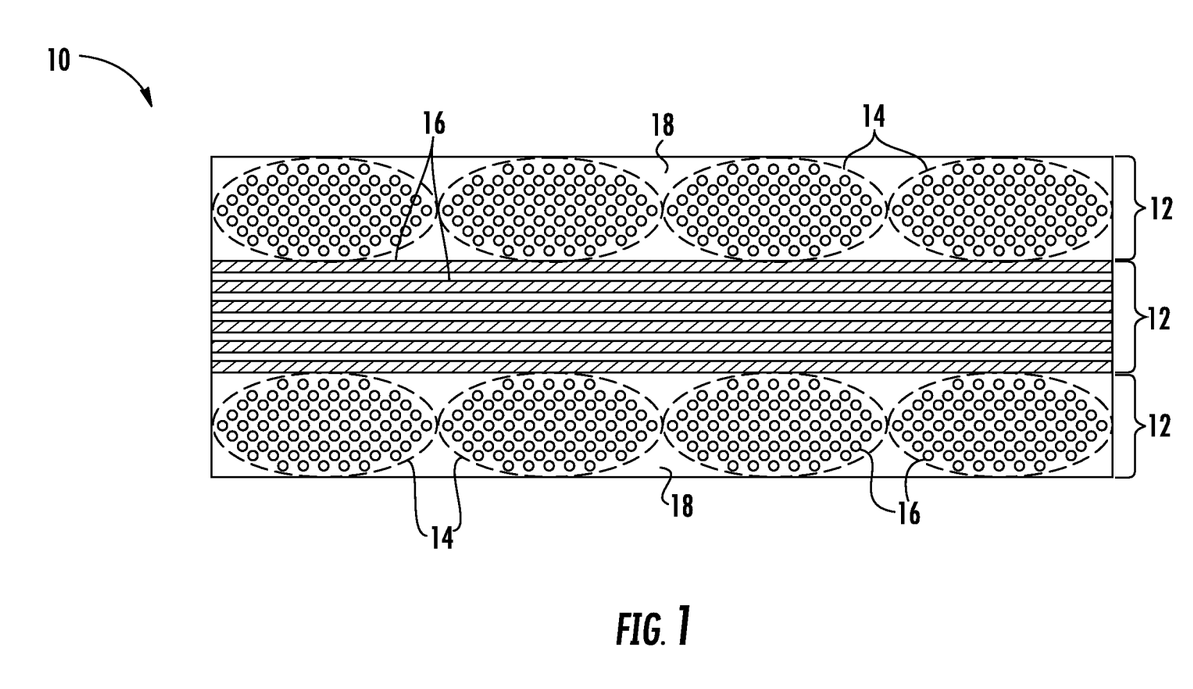
FIG. 1 schematically represents a fragmentary cross-sectional view of an exemplary CFCC article.

The following discussion of CMC articles makes reference to FIG. 1, which shows an exemplary CFCC component 10 comprising multiple laminae 12, each derived from an individual prepreg that originally comprised unidirectionally-aligned tows 14 impregnated with a ceramic matrix precursor. As a result of debulking, curing and firing the laminate preform formed by the stacked prepregs, each lamina 12 contains unidirectionally-aligned fibers 16 encased in a matrix 18 that includes a silicon carbide phase that may be formed in part by conversion of the ceramic matrix precursor during firing and melt infiltration.

As a CFCC component 10, the tows 14 are shown unidirectional in each lamina 12, i.e., oriented side-by-side and parallel to each other. Suitable fiber diameters, tow diameters and center-to-center tow spacings will depend on the particular application, the thicknesses of the laminae 12, and other factors, and therefore are not represented to scale in FIG. 1. In one embodiment, the individual fibers 16 have an average fiber diameter of about 200 µm to about 500 µm. The individual fibers 16 of the tows 14 are, in one particular embodiment, coated with one or more release agents to form a de-bond fiber coating (not shown) that allows for limited and controlled slip between the matrix 18 and the tows 14 and their individual fibers 16. Suitable materials for the fiber coating include boron nitride (BN), silicon-doped BN, silicon nitride ($Si_3N_4$), silicon carbide (SiC), hafnium carbide (HfC), hafnium nitride (HfN), zirconium carbide (ZrC), zirconium nitride (ZrN), tantalum carbide (TaC), tantalum nitride (TaN), and mixtures thereof. In one particular embodiment, the fiber coating comprises multiple layers of one or more of these compounds. As cracks develop in the component 10, fibers 16 that bridge the crack act to redistribute the load to adjacent fibers 16 and regions of the matrix 18, thus inhibiting or at least slowing further propagation of the crack.

In one embodiment, a prepreg process is used to manufacture the ceramic matrix composites. In such a process, a fiber tow is wound from a drum, and then passed through a vessel where a ceramic fiber coating is applied to the tow (e.g., via a chemical vapor deposition (CVD) process). This coating serves to protect the fibers during composite processing and provides a low strength fiber-matrix interface, thereby enabling the fiber matrix debonding and fiber pull-out "toughening" mechanisms. CMC's typically in the past used carbon as the fiber coating, but have since incorporated boron nitride or silicon-doped boron nitride for increased oxidation resistance. Following fiber coating, the fiber tow is pulled through a vessel containing a slurry including the preform matrix constituents (SiC and carbon particulate, binders and solvents), and then wound on a drum to form a unidirectional pre-impregnated, i.e., "pre-preg," tape.

During the fabrication of the component 10 a desired number of prepreg tapes are laid-up to form a preform that undergoes further processing to yield the component 10. Each tape is formed to contain a reinforcement architecture (formed by the fibers 16) encased within a precursor of the desired material for the matrix 18, e.g., SiC. Thus, the use of unidirectional fiber prepreg tapes builds up the composite structure. CMC architectures derived from unidirectional prepreg offer improved mechanical properties at elevated temperatures above the melting point of silicon. It is believed that because each fiber is well-isolated via the refractory matrix phase, mechanical loads can be transferred more efficiently to each individual fiber, which in turn promotes improved mechanical properties. According to conventional practice, such prepreg tapes can be formed in a single operation, for example, by applying a precursor-containing slurry during winding of a continuous strand of tow onto a drum. Following the winding operation, the slurry is allowed to partially or completely dried, removed from the drum, cut to shape, laid-up to give the desired fiber architecture and laminated to form a green composite preform.

The preform is then placed within a chamber where fiber coatings are applied to the preform using a chemical vapor infiltration (CVI) process. The preform is then heated in vacuum or in an inert atmosphere to decompose the organic binders and yield a porous rigid preform. For example, the laminate may be heated in nitrogen, argon, or vacuum to burn out a portion of the organic binders and resins within the pores, while also converting a portion of the binders and resins to carbon char. Machining of the preform can be done at this stage, which helps to reduce the amount of final machining of the part after final densification.

The burned-out porous laminate can then be melt infiltrated by heating an external source of silicon infiltration mixture such that it melts and flows into the laminate. A first portion of this silicon infiltration mixture reacts with the precursor carbon in the porous laminate to form silicon carbide, and a second portion of the silicon infiltration mixture fills the porosity in the laminate. The melt infiltration (MI) process is particularly suitable for use after the preform was formed with a slurry that, upon firing, results in a carbon-containing preform that preferably reacts with molten silicon to form silicon carbide. Carbon additions can also be achieved by subjecting the porous preform to direct infiltration of carbon black particles or burnout of a carbon-yielding resin that had been infiltrated into the pore space. In one embodiment, the composite preform, containing the coated SiC fibers, SiC and/or carbon particulates, and organic binders in the prepreg case, is heated to the infiltration temperature while in contact with or in proximity to the silicon infiltration mixture (e.g., a source of silicon metal). The molten silicon metal (e.g., at a melt infiltration temperature of about 1414° C. to about 1500° C.) readily wets SiC and/or carbon, and therefore is easily pulled into the remaining porosity of the preforms by a capillary process. No external driving force is needed for the infiltration and there is no dimensional change of the composite preform.

The densification processes noted above can benefit from the use of certain prepreg slurries that preferably do not leave residual elemental silicon or silicon alloys in the porous preform, and preferably yield a continuous network of silicon carbide or carbon to provide strength within the porous preform prior to infiltration. Various precursor-containing slurries have been applied to continuous fibers and tows to produce prepreg tapes. Typical slurry compositions have contained, in addition to the desired ceramic precursor (s), ceramic constituents of the matrix (for example, silicon carbide), organic resins that serve as processing aids (for example, polyvinybutyral and poly isobutyl methacrylate), solvents (for example, toluene, MIBK, ethylbenzene, etc.), and plasticizers for the binders (for example, dibutyl phthalate). The slurry compositions may contain an approximately 1:1 stoichiometric mixture of elemental silicon and carbon black that react during firing of the preform (e.g., at temperatures of about 1430° C. to about 1460° C.). Alternatively or additionally, the slurry composition may additionally contain one or more organic binders that can be pyrolyzed to form a network of carbon char (for example, furanic resins and/or phenolic resins). In any case, the result is preferably a cured and rigid preform leaves only a residual amount of elemental silicon and/or silicon alloys within the pores, and in which the fibers are encased in a porous yet continuous network of silicon carbide filaments or carbon char (depending on the particulars of the embodiment as described above). Additional processing steps can be performed to extract any residual elemental silicon and/or low-melting silicon alloy phase within the CMC article. An extraction step is particularly desirable if a slurry is used that contains an excess of elemental silicon relative to what is needed for a 1:1 stoichiometric mixture of elemental silicon and carbon black, or if a slurry is used that does not contain any elemental silicon and a melt infiltration step is performed using an external source of elemental silicon or a silicon alloy as the infiltrant. For the latter, typical slurry compositions have contained silicon carbide, carbon black, organic resins that serve as processing aids (for example, polyvinybutyral), organic resins that are pyrolyzed to form a network of carbon char, solvents (for example, toluene, MIBK, alcohols, and acetone), etc.), and plasticizers for the binders (for example, dibutyl phthalate).

A suitable extraction technique is a powder pack extraction process that involves surrounding the CMC article with a porous material and heating until the silicon or silicon alloy is molten. Porous materials may include, but are not limited to, carbon black, graphite, industrial diamond, silicon carbide, silicon nitride, molybdenum and its silicides, carbides and nitrides, tungsten and its silicides, carbides and nitrides, tantalum and its silicides, carbides and nitrides, and/or niobium and its silicides, carbides and nitrides. Preferred porous materials include those that provide a chemical driving force to draw out the silicon or silicon alloy, do not react strongly with the silicon carbide in the melt-infiltrated body and, in case there is a shallow reaction layer, are easily removed by grinding or grit blasting to ensure that the pore network left behind is open for subsequent infiltration. Preferred porous materials include molybdenum, tungsten, tantalum, niobium metal, and niobium silicides. These materials are capable of adequately extracting residual silicon and silicon alloy and forming metal silicides on the surface of the CMC article that are easily removed by grit blasting to expose pore channels within the CMC article. Once exposed, the pore channels can be filled with one or more precursors that can be converted to silicon carbide by a PIP, MI, or CVI technique.

Another suitable extraction technique is a liquid phase extraction process carried out by exposing the CMC article to a liquid that is corrosive to residual silicon alloy, but not to any other components of the CMC article. Examples of such liquids are hydrofluoric acid (HF), mixtures of hydrofluoric acid and other acids, strongly basic solutions such as aqueous NaOH, LiOH, KOH, etc., liquid metals such as gallium, indium, tin, and mercury, and multistage leaching processes that involve liquid metals, acids, and bases. The liquid phases can be heated to increase the rate at which they dissolve the residual silicon alloy. This is particularly true for liquid metals, which require an elevated temperature to activate the silicon alloy removal process. Heat treatments may be performed to eliminate any contaminants, for example, to evaporate fluorine or any metal in the pore channels. As before, the exposed pore channels can be filled with one or more precursors that can be converted to silicon carbide by a PIP, MI, or CVI technique.

Figure 2:
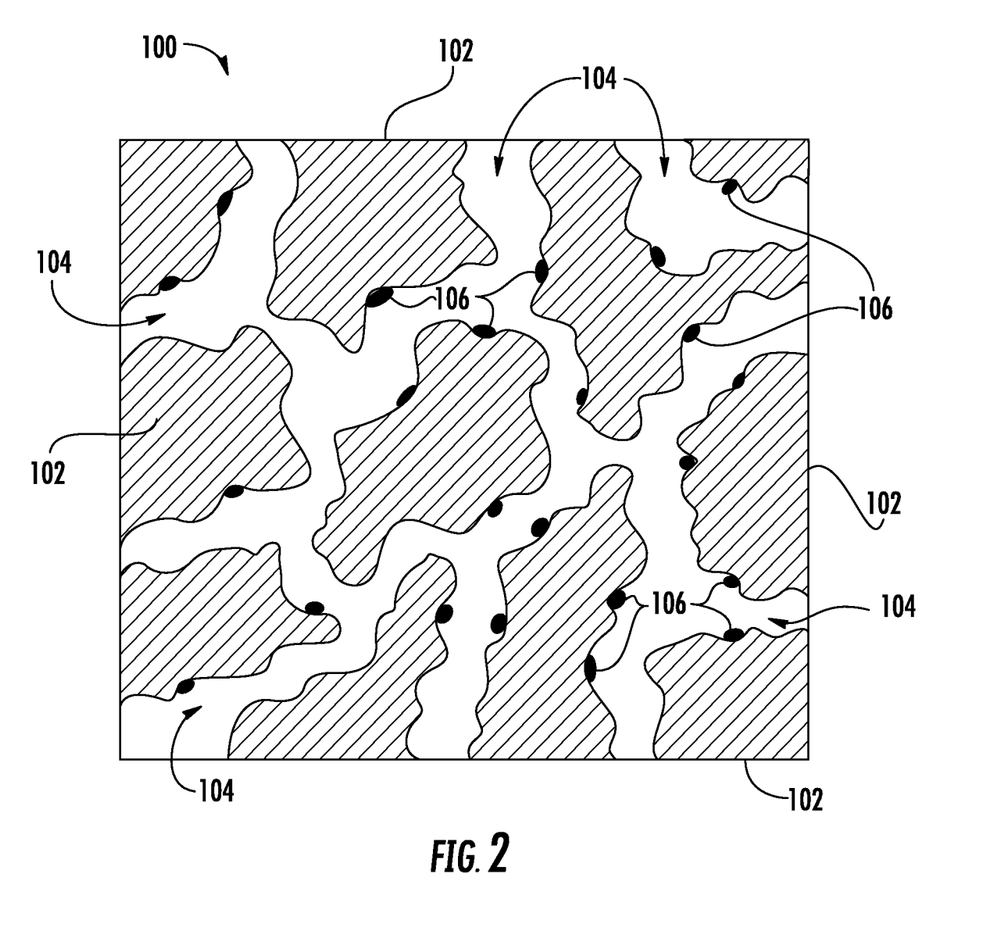
FIG. 2 schematically represents an exploded cross-sectional view of an exemplary CMC article following melt extraction leaving residual silicon within open pore channels between SiC grains.

No matter the extraction technique utilized, the melt-infiltrated preform is formed that defines open pore channels with a residual amount of silicon therein. For example, FIG. 2 shows an exemplary porous preform 100 having SiC grains 102 that define pore channels 104 therebetween. The pore channels 104 may have a size range that is about 0.5 µm up to about 2 times the fiber diameter within the CMC. For example, the pore channels 104 may have a size of about 0.5 µm to about 1 mm, such as about 0.5 µm to about 500 µm. As shown in FIG. 2, residual silicon 106 is positioned within the pore channels 104, even after the extraction process.

Figure 3:
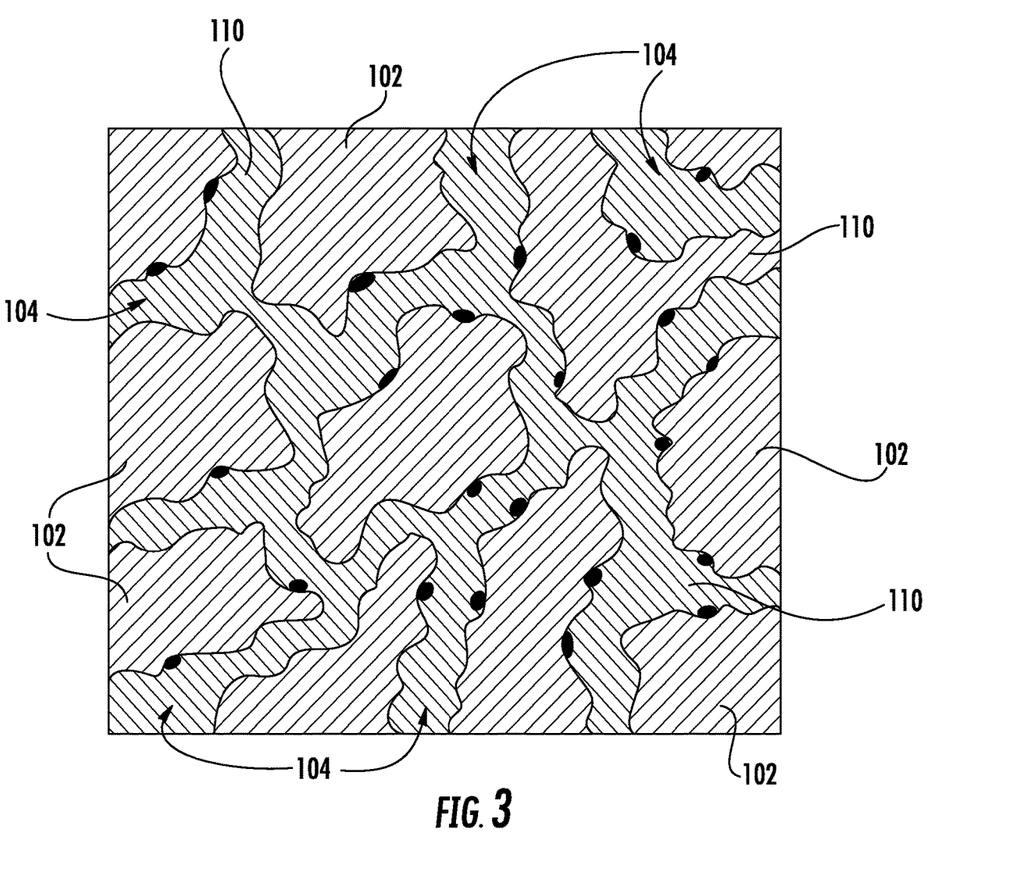
FIG. 3 schematically represents an exploded cross-sectional view of an exemplary CMC article after introducing carbon yielding resin into the open pore channels.

As shown in FIG. 3, a carbon yielding resin 110 is introduced into the open pore channels 104 of the preform 100. In one embodiment, the carbon yielding resin 110 is introduced into the open pore channels 104 at a temperature of about 20° C. to about 100° C. In one embodiment, the carbon yielding resin 110 may be introduced as a liquid. For example, the carbon yielding resin 110 may be introduced into the open pore channels 104 at a pressure of about 0.001 Torr to less than 1 Torr, which may facilitate the penetration of the carbon yielding resin 110 into the pore channels 104.

The carbon yielding resin 110 generally includes a cross-linkable polymeric material with a suitable curing agent (e.g., in a solvent or other carrier). In one embodiment, the crosslinkable polymeric material are polyesters, vinyl esters, epoxy resins, furfuryl alcohol based resins, or other fast-curing thermosetting resins. In one embodiment, the resin composition forms an excess stoichiometric amount of elemental carbon so as to consume substantially all of the residual silicon 106 to form a dense SiC within the pore channels 104.

An exemplary slurry composition includes a polyester resin, a suitable curing agent (e.g., benzoyl peroxide), an optional ceramic component (e.g., SiC), and optionally carbonaceous solids component including organic binders or other fillers. The carbon filler loading is generally higher than a level used in the high char resin systems referenced above in order to achieve a comparable carbon yield. For example, carbon-containing fillers in known high char resin systems may be about 27 volume %. In exemplary embodiments disclosed herein, preforms, prior to cure, may include carbon fillers at levels up to about 60-70 volume % by utilizing solvent (e.g., acetone) prior to shaping and removing the solvent prior to cure. Other exemplary embodiments may include the carbonaceous solids component at levels greater than about 30 volume %. Exemplary carbonaceous material may include graphite particles, flakes, whiskers, or fibers of amorphous, single crystal or poly-crystalline carbon, carbonized plant fibers, lamp lack, finely divided coal, charcoal, and carbonized polymer fibers or felt such as rayon poly-acrylonitrile, and polyacetylene. In one embodiment, the carbon yielding resin comprises a plurality of carbon particles having an average diameter that is smaller than a pore size of the open pore channels.

Ideally, the resin(s) provide adequate flow without requiring significant amount of solvent. "Adequate flow" may be determined by the processing requirements such as the flow required to consolidate the resin system during the cure stage. Other processing methods, such as mixing the slurry to a homogenous mixture or winding into a tape may require lower viscosity than consolidation. Those with skill in the art will appreciate the flow requirements for the desired outcomes. Exemplary embodiments may include acetone or other easily removed solvent. Benzoyl peroxide or other agents may be utilized to initiate polymerization of the resin(s).

Exemplary embodiments may include acetone or other easily removed solvent. Benzoyl peroxide or other agents may be utilized to initiate polymerization of the resin(s).

Figure 4:
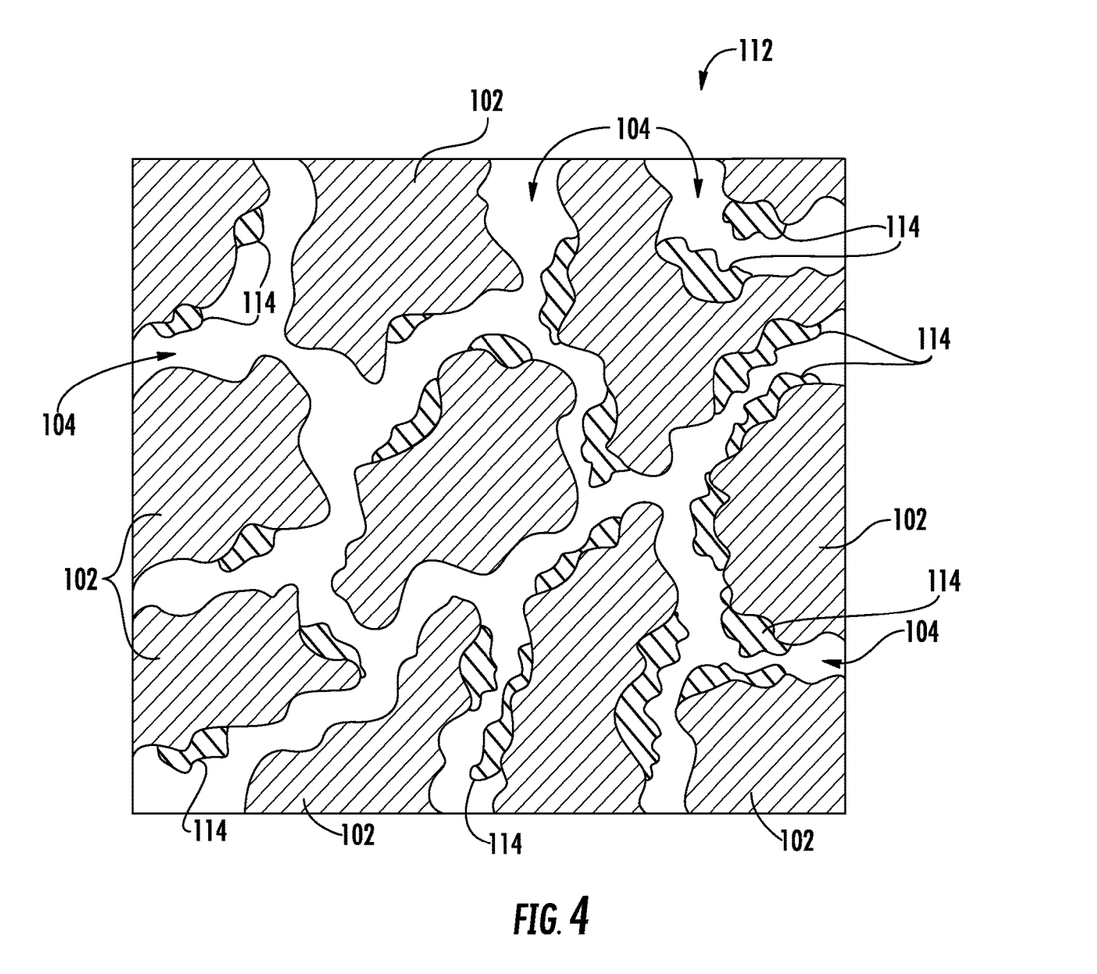
FIG. 4 schematically represents an exploded cross-sectional view of an exemplary CMC article after reacting the carbon yielding resin to form carbon that then reacts with the residual Si within the open pore channels.

The preform 100 may then be heated to produce elemental carbon from the carbon yielding resin 110 within the open pore channels 104. For example, the preform 100 may be first heated to a crosslinking temperature (e.g., about 100° C. to about 250° C.) to cure the carbon yielding resin 110. Removal of substantially all the solvent, if used, prior to cure, and use of a relatively fast curing thermosetting resin promotes substantially total cure, providing dimensional stability to the preform. Thereafter, the preform 100 may be heated to a char temperature (e.g., about 1315° C. to about 1500° C.) such that the crosslinked carbon yielding resin produces the elemental carbon and reacts with the residual silicon 106 within the open pore channels 104. That is, the cured resin is pyrolyzed to yield carbon content for subsequent reaction with the residual silicon 106 to form the silicon carbide composite. In one embodiment, the char temperature is greater than the melting point of silicon (i.e., about 1414° C., such as about 1414° C. to about 1500° C.) such that the residual silicon 106 is melted for reaction with the carbon. In another embodiment, the char temperature is less than the melting point of silicon (i.e., about 1315° C. to about 1400° C.) such that a solid state reaction occurs between the elemental carbon and the residual silicon 106. FIG. 4 shows the resulting CMC component 112 that includes SiC particles 114 formed within the pore channels 104.

In one embodiment, these processing techniques are intended to greatly improve the temperature capability of a CMC article produced by processing steps of the type described above by reducing or entirely eliminating porosity within the CMC article, as well as reducing or entirely eliminating any residual elemental silicon and/or low-melting silicon alloys in the CMC article.

While various applications are foreseeable, particular applications for the component 10 include components of gas turbine engines, such as combustor liners, blades, vanes and shrouds within the turbine sections of gas turbines.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a ceramic matrix composite from a melt infiltrated and melt extracted preform that has residual silicon within open pore channels therein, the method comprising:
   introducing a carbon yielding resin into the open pore channels;
   heating the preform to produce elemental carbon from the carbon yielding resin within the open pore channels;
   thereafter, further heating the elemental carbon to react with the residual silicon to form SiC within the open pore channels to form the ceramic matrix composite, wherein an excess stoichiometric amount of elemental carbon is formed compared to the residual silicon; and
   thereafter, melt infiltrating silicon to react with the excess stoichiometric amount of elemental carbon of the ceramic to form a dense SiC within the pore channels.

2. The method of claim 1, wherein the carbon yielding resin comprises a crosslinkable polymeric material.

3. The method of claim 2, wherein the crosslinkable polymeric material comprises a polyester, a vinyl ester, a furfuryl alcohol based polymer, an epoxy, or a mixture thereof.

4. The method of claim 2, wherein heating the preform to produce elemental carbon from the carbon yielding resin within the open pore channels, comprises:
   heating the preform to a crosslinking temperature such that the carbon yielding resin is crosslinked within the open pore channels, wherein the crosslinking temperature is about 100° C. to about 250° C.; and
   thereafter, heating the preform to a char temperature such that the crosslinked carbon yielding resin produces the elemental carbon and reacts with the residual silicon within the open pore channels, wherein the char temperature is about 1315° C. to about 1500° C.

5. The method of claim 4, wherein the char temperature is about 1414° C. to about 1500° C.

6. The method of claim 4, wherein the char temperature is about 1315° C. to about 1400° C. such that solid state reaction occurs between the elemental carbon and the residual silicon.

7. The method of claim 2, wherein the carbon yielding resin further comprises a solvent.

8. The method of claim 1, wherein the introducing the carbon yielding resin into the open pore channels is performed at a pressure of about 0.001 Torr to less than 1 Torr.

9. The method of claim 1, wherein the carbon yielding resin comprises a plurality of carbon particles.

10. The method of claim 9, wherein the plurality of carbon particles have an average diameter that is smaller than a pore size of the open pore channels.

11. The method of claim 1, wherein the carbon yielding resin is introduced as a liquid, and wherein the carbon yielding resin is introduced at a temperature of about 20° C. to about 100° C.

12. The method of claim 1, further comprising, prior to introducing the carbon yielding resin into the open pore channels:
   melt infiltrating silicon into the preform such that the silicon reacts with carbon in the ceramic matrix composite to form SiC grains, wherein melt infiltrating is performed at a melt infiltration temperature of about 1414° C. to about 1500° C.; and
   melt extracting to remove at least a portion of unreacted silicon from the preform to open pore channels while leaving residual silicon therein.

13. The method of claim 1, wherein the preform comprises fibers having an average fiber diameter that is about 200 µm to about 500 µm.

14. The method of claim 13, wherein the pore channels have a size range that is about 0.5 µm to about 1 mm.

15. The method of claim 13, wherein the pore channels have a size range that is about 0.5 µm to about 500 µm.

16. The method of claim 1, wherein the ceramic matrix composite preform comprises SiC fibers dispersed within a ceramic matrix, and wherein the ceramix matrix comprises SiC.

17. The method of claim 16, wherein the SiC fibers have a coating thereon, wherein the coating comprises BN.

* * * * *